United States Patent [19]

Knowles et al.

[11] 3,862,237

[45] Jan. 21, 1975

[54] DIHYDROXY CARBORANES AND THE METHOD OF PREPARATION

[75] Inventors: Thomas A. Knowles, Cheshire; Robert N. Scott, Wallingford, both of Conn.

[73] Assignee: Olin Corporation, New Haven, Conn.

[22] Filed: June 4, 1973

[21] Appl. No.: 366,346

[52] U.S. Cl. ........................... 260/606.5 B, 176/87
[51] Int. Cl. ................................................ C07f 5/02
[58] Field of Search ............................ 260/606.5 B

[56] References Cited
UNITED STATES PATENTS

| | | |
|---|---|---|
| 3,183,272 | 5/1965 | Dvorak et al. ............... 260/606.5 B |
| 3,351,616 | 11/1967 | Green et al. ................. 260/606.5 B |
| 3,542,817 | 11/1970 | Grafstein et al. ............. 260/606.5 B |
| 3,669,993 | 6/1972 | Barnes et al. ................ 260/606.5 B |
| 3,674,853 | 7/1972 | Obenland et al. ............ 260/606.5 B |

*Primary Examiner*—Daniel E. Wyman
*Assistant Examiner*—A. P. Demers
*Attorney, Agent, or Firm*—Robert L. Andersen; Eugene Zagarella, Jr.

[57] ABSTRACT

Novel 1,7- and 1,12-dihydroxy meta- and paracarboranes are prepared by the controlled oxidation of the corresponding di(alkali metal) carborane salts.

12 Claims, No Drawings

DIHYDROXY CARBORANES AND THE METHOD OF PREPARATION

The invention herein described was made in the course of or under a contract or subcontract thereunder, with the Department of the Navy.

This invention relates to novel 1,7- and 1,12-dihydroxy-m- and -p-carboranes and the method of preparation.

The monohydroxy derivatives of the various carboranes have previously been prepared as disclosed in Zaharkin et al., "Synthesis of 1-Hydroxycarboranes," Chem.Abstracts, Vol. 71, 1969, 124555v; Brattsev et al., "Oxidation of o-, m- and p-Carboranes," Chem.Abstracts, Vol. 74, 1971, 141930t and Zakharkin et al., "Preparation of 1-Hydroxy-o- and -m-Carboranes During the Oxygen Oxidation of Lithium o- and m-Carboranes," Chem.Abstracts, Vol. 74, 1971, 141931u.

Now it has been found that by using the controlled oxidation method of this invention previously unknown dihydroxy carboranes having the following general formula can be prepared:

   I.

wherein R is selected from the group consisting of hydrogen, alkyl of 1 to 5 carbon atoms such as methyl, ethyl and butyl and alkenyl of 2 to 5 carbon atoms such as vinyl and allyl. It is noted that the radical $-CB_{10}H_9-RC-$ found in the above formula (I) is used to represent both of the well-known meta (m-) and para (p-) carborane cage structures, i.e. the 1,7- and 1,12-carboranes as shown for example in U.S. Pat. No. 3,397,221 issued on Aug. 13, 1968 to S. Papetti. Henceforth, in the specification and claims, the use of this radical and the term carborane is intended to include both of such well-known meta and para carborane cage structures. It is further noted that the above-identified carborane compounds (I) of this invention may include more than one substituted group as well as other substituents such as aryl and halo groups. It is intended when referring to the carborane compounds (I) to include compounds containing such substituents.

Broadly stated, the dihydroxy carborane compounds (I) of this invention may be prepared by the controlled oxidation of selected di(alkali metal) carborane salts in the presence of selected hydrocarbon solvents.

The starting di(alkali metal) carborane materials have the following general formula:

where M is an alkali metal and more particularly an alkali metal selected from the group consisting of lithium, sodium and potassium with lithium being preferred and R is selected from the group consisting of hydrogen, alkyl of 1 to 5 carbon atoms and alkenyl of 2 to 5 carbon atoms. Such starting di(alkali metal) carborane materials may be prepared in accordance with the method disclosed in U.S. Pat. No. 3,148,219 issued Sept. 8, 1964 to Ager et al., wherein an alkali metal alkyl or aryl compound is reacted with a selected carborane compound. Other R substituents may be used and more than one of such substituents may also be used if desired.

In carrying out the oxidation method of this invention, an inert hydrocarbon solvent may be used and more particularly an aliphatic hydrocarbon of from about 4 to about 20 carbon atoms or an aromatic hydrocarbon of from about 6 to about 20 carbon atoms. Preferred solvents are aliphatic hydrocarbons of from about 5 to about 8 carbon atoms and aromatic hydrocarbons of from about 6 to about 10 carbon atoms. Exemplary of such solvents are the following compounds: benzene, toluene, xylene, hexane, heptane, and cyclohexane. Further illustrations of solvents of this type are disclosed in "Industrial Solvents" by Ibert Mellan, 2nd Edition, 1950.

While the oxidation reaction of this invention may be carried out by adding oxygen over varying amounts of time, it has been particularly found that significant yields of the dihydroxy carboranes (I) may be obtained by adding oxygen to the reaction mixture at a fairly slow rate. More particularly, oxygen may be added over a period of from at least about 0.5 to about 24 hours and preferably from at least about 2 to about 8 hours. The upper time limit is of course not critical except as a practical matter of expediency. While the rate of addition, as noted above, is fairly important, the amount of oxygen used is not particularly critical. Generally at least a slight excess of the stoichiometric amount of oxygen is used.

The method of this invention will generally be carried out over a temperature range which can vary from about 0° to about 30°C. and preferably from about 5° to about 15°C. While varying pressure conditions may be used, atmospheric pressure has been found particularly useful in carrying out this method.

The compounds of this invention (I) have the desirable characteristic of being water soluble and have a wide variety of uses. For example, they may be used as burn rate modifiers for propellants, as polymer intermediates, and also in boron-neutron capture therapy and neutron radiation shields.

The following examples are presented to further illustrate the invention without any intention of being limited thereby.

EXAMPLE I

A 500 ml., 3 neck flask equipped with mechanical stirrer, addition funnel and nitrogen inlet was charged with 25 g. m-carborane dissolved in 100 ml. anhydrous diethyl ether and 160 ml. of a 2.15 M n-butyllithium solution in hexane added dropwise at 0°C. The insoluble dilithio-m-carborane was freed from solvent and excess butyl-lithium by inverse filtration, washed 3 times with 100 ml. portions of dry petroleum ether and then resuspended in 100 ml. of dry benzene. Oxygen was then bubbled through the suspension over the course of an hour with the temperature maintained below 25°C. during the early (first 10 min.) exothermic phase of the reaction by means of an ice bath and periodic interruption of the oxygen addition. The reaction mixture was then stripped of solvent at ambient temperature in vacuo and the residue extracted with 250 ml. of hot 1 N aqueous NaOH. The mixture was filtered to remove insoluble m-carborane (15 g.), the filtrate cooled to room temperature and then extracted 3 times with 100 ml. portions of diethyl ether. The aqueous layer was next acidified via addition of concentrated HCl and extracted with two 200 ml. portions of diethyl ether. The combined ether layers were stripped of solvent and the residue purified by sublimation in vacuo. The sublimate (2.56 g.) was shown by vapor phase chromatography (VPC) and gas chromatography mass spectrometry (GCMS) analyses to be a mixture, containing 58.5% of 1,7-dihydroxy-m-carborane and 41.5% monohydroxy-m-carborane.

EXAMPLE II

A 1 liter, 3 neck flask equipped with a mechanical stirrer, addition funnel, thermometer and nitrogen inlet was charged with 50 g. (0.35 mol) m-carborane dissolved in 250 ml. diethyl ether and 325 ml. of a 2.37 M n-butyllithium solution in hexane added dropwise at 0°C. The insoluble dilithio-m-carborane was freed from solvent and excess butyllithium by inverse filtration, washed twice with 200 ml. portions of dry petroleum ether and then suspended in 300 ml. dry benzene. Oxygen was then bubbled through the suspension over the course of 4 hours while the temperature was maintained below 10°C. by means of an ice bath and periodic interruption of the oxygen addition. The reaction mixture was stripped of solvent in a warm water bath on a rotary evaporator and the tan residue extracted with 500 ml. of hot 1 N aqueous NaOH. The mixture was cooled to room temperature and extracted three times with 200 ml. portions of diethyl ether. The aqueous layer was next acidified by addition of concentrated hydrochloric acid and then extracted three times with 150 ml. portions of diethyl ether. The combined ether extracts were evaporated to dryness to give 10 g. of viscous brown product which was shown by gas chromatography to consist of a mixture of mono- and dihydroxy-m-carboranes in the approximate ratio of 1:4, respectively. A portion of this mixed product was then extracted with hot water; filtration followed by removal of water in vacuo left a white solid which was further purified by sublimation and identified as 1,7-dihydroxy-m-carborane by elemental, gas chromatographic, nuclear magnetic resonance (NMR) and mass spectrometric analyses.

EXAMPLE III

A 1 liter, 3 neck flask equipped with a mechanical stirrer, addition funnel, thermometer and nitrogen inlet was charged with 40 g. (0.28 mol) p-carborane dissolved in 200 ml. diethyl ether and 300 ml. of a 2.37 M n-butyllithium solution in hexane added dropwise at 0°C. The insoluble dilithio-p-carborane was freed from solvent and excess butyllithium by inverse filtration, washed three times with 200 ml. portions of dry hexane and then suspended in 300 ml. dry benzene. Oxygen was then bubbled through the suspension over the course of 4 hours, while the temperature was maintained below 10°C. by means of an ice bath. The reaction mixture was stripped of solvent in a warm water bath in vacuo and the tan residue extracted with 500 ml. hot 1 N aqueous NaOH. The mixture was cooled to room temperature and extracted three times with 200 ml. portions of diethyl ether. The aqueous layer was next acidified by addition of 50% hydrochloric acid and then extracted three times with 100 ml. portions of diethyl ether; the ether extracts were dried over anhydrous $MgSO_4$, filtered and evaporated to give 19 g. of cream-colored solid mixture of mono- and dihydroxy-p-carboranes in the ratio of approximately 3:7, respectively as identified by vapor phase chromatography (VPC) and gas chromatography mass spectrometry (GCMS) analyses.

What is claimed is:

1. A carborane compound of the formula:
   $HOCB_{10}H_9RCOH$
   where $—CB_{10}H_9RC—$ represents the meta or para carborane radical and R is selected from the group consisting of hydrogen, alkyl of 1 to 5 carbon atoms and alkenyl of 2 to 5 carbon atoms.

2. The compound of claim 1 wherein $—CB_{10}H_9RC—$ represents the meta carborane radical and R is hydrogen.

3. The compound of claim 1 wherein $—CB_{10}H_9RC—$ represents the para carborane radical and R is hydrogen.

4. The method for preparing the compound of claim 1 comprising reacting a di(alkali metal) carborane compound of the formula:
   $MCB_{10}H_9RCM$
   where M is an alkali metal and R is selected from the group consisting of hydrogen, alkyl of 1 to 5 carbon atoms and alkenyl of 2 to 5 carbon atoms with oxygen.

5. The method of claim 4 wherein said oxygen is added to the reaction mixture over a period of at least about 0.5 hours.

6. The method of claim 5 where said alkali metal is selected from the group consisting of lithium, sodium and potassium.

7. The method of claim 6 wherein said solvent is selected from the group consisting of aliphatic hydrocarbons of from about 4 to about 20 carbon atoms and aromatic hydrocarbons of from about 6 to about 20 carbon atoms.

8. The method of claim 7 wherein said alkali metal is lithium.

9. The method of claim 8 wherein said solvent is benzene.

10. The method of claim 9 wherein $—CB_{10}H_9RC—$ represents the meta carborane radical and R is hydrogen.

11. The method of claim 9 wherein $—CB_{10}H_9RC—$ represents the para carborane radical and R is hydrogen.

12. The method of claim 9 wherein said oxygen is added to the reaction mixture over a period of at least about 2 hours.

* * * * *